May 22, 1962 C. E. MAYO 3,035,545
POULTRY FEEDER
Filed Sept. 2, 1960 2 Sheets-Sheet 1

Carlos E. Mayo
INVENTOR.

BY *Clarence A. O'Brien*
*and Harvey B. Jackson*
Attorneys

May 22, 1962 C. E. MAYO 3,035,545
POULTRY FEEDER
Filed Sept. 2, 1960 2 Sheets-Sheet 2
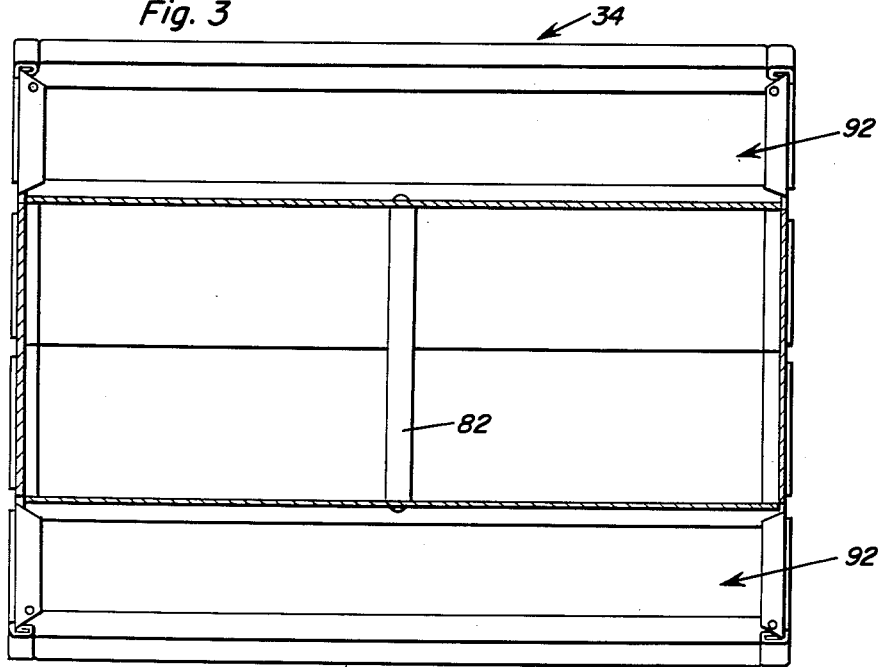
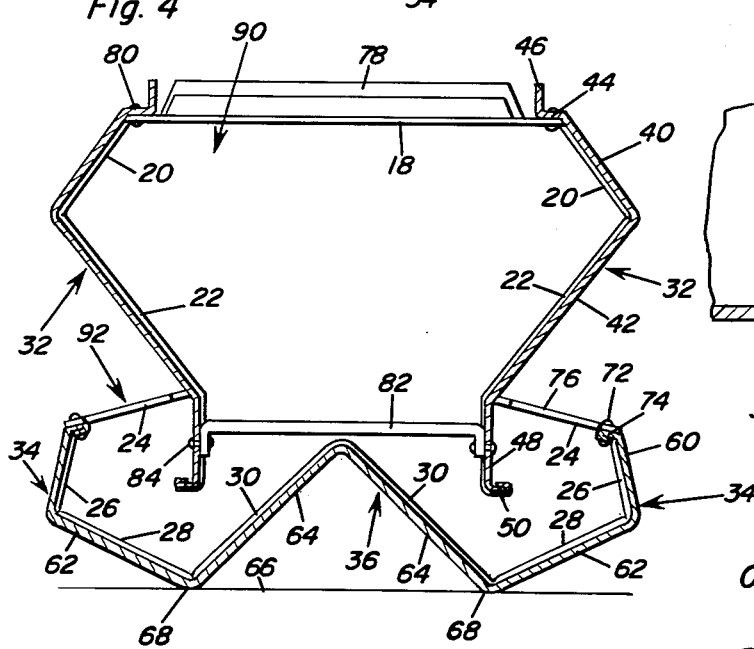
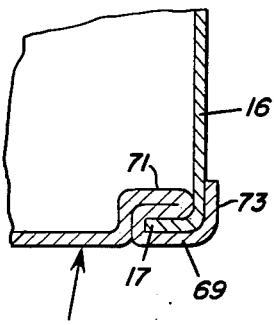
Carlos E. Mayo
INVENTOR.

3,035,545
POULTRY FEEDER
Carlos E. Mayo, Springdale, Ark., assignor to Sav-Mor Feeder Company, Inc., Springdale, Ark., a corporation of Arkansas
Filed Sept. 2, 1960, Ser. No. 53,699
1 Claim. (Cl. 119—52)

This invention relates generally to a poultry feeder and more particularly to a construction which permits simultaneous feeding of both large and small birds.

Several different types of poultry feeders are commercially available and several others in addition are shown amongst the prior art patents and literature. Most of these are satisfactory for most purposes and are disadvantageous only with respect to certain features. Amongst these features are that most feeders do not permit the simultaneous feeding of both large and small birds. Of those feeders that do permit both large and small birds to be fed, they are often subject to other disadvantages as will become more apparent below. In the light of this, it is the principal object of this invention to provide a novel and improved poultry feeder construction including upper and lower feed openings which permit large and small birds to feed simultaneously.

It is a more particular object of this invention to provide an improved poultry feeder construction including a reduced open upper feed portion for minimizing feed loss.

It is a still further object of this invention to provide a novel poultry feed construction wherein the bottom portions thereof are substantially V-shaped thereby permitting only narrow linear portions of the construction to contact the floor or ground resulting in a minimizing of rust.

It is a still further object of this invention to provide a novel poultry feeder construction which although representing an improvement over heretofore known devices, is no more expensive and which in fact may be manufactured of a minimum weight at a minimum cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a horizontal sectional view taken substantially along the plane 3—3 of FIGURE 1;

FIGURE 4 is a vertical sectional view taken substantially along the plane 4—4 of FIGURE 1; and FIGURE 5 is a fragmentary sectional view taken substantially along the plane 5—5 of FIGURE 1.

Figure 1:
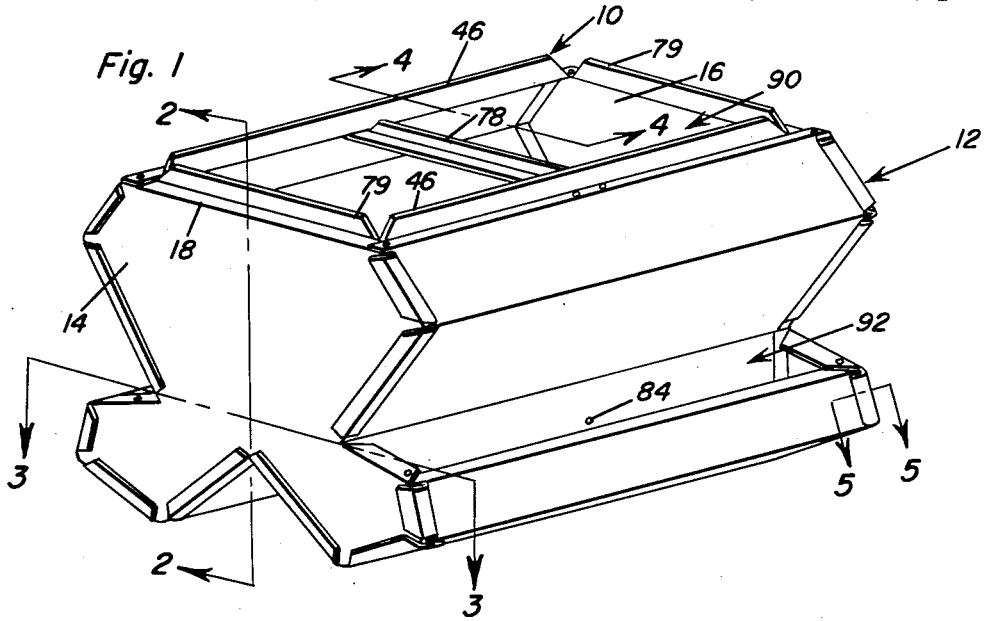
FIGURE 1 is a perspective view of the poultry feeder construction.
Figure 2:
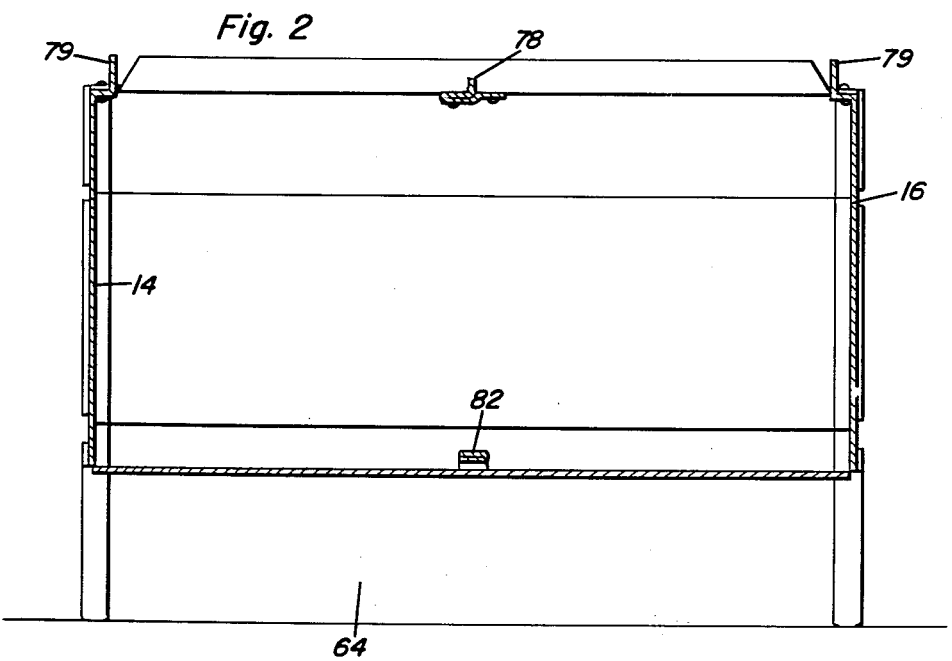
FIGURE 2 is a vertical sectional view taken substantially along the plane 2—2 of FIGURE 1.

With continuing reference to the drawings, initial attention is called to FIGURE 1 wherein numeral 10 generally represents the poultry feeder construction comprising this invention. The feeder includes a hopper 12 defined between end walls 14 and 16. The end walls 14 and 16 are identical and include inturned top flanges 18. Downwardly and outwardly directed edges 20 depend therefrom, terminating in downwardly and inwardly directed edges 22. Edges 24 are contiguous with edges 22 and again extend outwardly and downwardly terminating in substantially vertical edges 26. Edges 28 are contiguous with edges 26 and extend both inwardly and downwardly and terminate in edges 30 which converge to form a substantially inverted V.

A pair of upper walls and a pair of lower walls bridge the end walls 14 and 16. The upper walls are generally designated by the numeral 32 and it will be noted (FIGURE 4) that they are opposed and identical. The lower walls 34 are opposed and identical and each is formed integral with an inverted V-shaped bottom 36.

Each of the upper walls includes an outwardly and downwardly directed first section 40 and an inwardly downwardly directed second section 42. A horizontal ledge or flange 44 extends from the section 40 and terminates in a vertically extending portion 46. The section 42 terminates in a vertical third section 48 which has a flange 50 extending perpendicularly therefrom. The upper walls 32 are secured to the end walls 14 and 16 in any convenient manner. It is suggested however that terminal flange portions on the upper walls be crimped together with flange portions on the end walls in the manner shown in FIGURE 5. However, if desired, fastening may be accomplished by bolting, spot-welding or such.

The lower walls 34 include the downwardly slightly outwardly flared first section 60 which terminates in the inwardly and downwardly directed section 62. Formed integral with and joined between the second section 62 of the opposed lower walls 34 is the bottom 36 which includes upwardly converging sections 64. It will be appreciated that the bottom 36 forms substantially an inverted V with V-portions also being formed between adjacent sections 62 and 64. It will be appreciated that the feeder 10 therefore rests on the ground surface 66 along the portions 68 which effectively represent narrow strip portions. Again it is pointed out that the lower trough walls 34 and the hopper walls 40 and 42 are secured to the end walls 14 and 16. As shown in FIGURE 5 the flange 17 of the end wall 16 extends inwardly and is crimped between a terminal portion 69 of the lower wall 34. The terminal portion 69 abuts the flange 17 and includes an inwardly and then right-angularly extending return bend flange 71 engaged behind said flange 17. The portion 69 further includes an inwardly right angularly bent enclosing end flange 73 which abuts the wall 16, which wall is received and clamped between said flange 73 and the opposed return bend or bight portion of the flange 71. Thus, without the use of rivets, screws or other extraneous securing elements, a simple but extremely strong, rigid interlocking joint is provided between the members 34, 42, etc.

In addition to the crimped portions respectively of the lower wall 34 and end walls 14 and 16, rivets 72 may be secured between flange portion 74 on section 60 and flange 76 on the edge 24 of the end wall.

Brace 78 is riveted at 80 between ledges 44 of the upper walls 32. It is contemplated that the brace 78 be provided in the center. Brace 78 serves as a handle for rendering the feeder more easily portable if desired. Additional brace support means 82 are secured between sections 48 on the opposed upper walls 32 by rivets 84.

In use, feed is deposited in the open upper end 90 of the feeder. It will be appreciated that the open portion 90 is reduced to a substantially narrow dimension without limiting the quantity of feed which feeder 10 can hold. Lower feed openings 92 are defined on each side of the device. The upper terminal edge of the section 60 is laterally displaced from the lower terminal edge of the section 42 with the lower feed openings 92 defined therebetween. When feed is therefore inserted into the feeder 10 through the opening 90, it will fall to the bottom 36 and be substantially evenly divided between the V-shaped pockets formed by each of the lower walls 34. Access can be had to the thoroughly evenly divided feed quantity by small birds through the openings 92 and by large birds through the openings 90. The feed falling to the bottom will ride along the section 64 and collect in the V-shaped pockets between the adjacent sections 62 and 64. The significance of the V-shaped portion defined by the sections 62 and 64 is emphasized. Normally, the bottom portions of feeders engage the ground and rusting out of the portions engaged with the ground is encouraged due to the moisture on the ground and the moisture held by the feed. By minimizing the contact area between the feeder 10 and the ground, the rusting out is materially reduced.

The narrow or reduced upper feed opening 90 is significant because the reduction in the opening minimizes loss therefrom.

Although the particular materials employed and the securing means utilized are subject to particular design considerations, it has been found that extremely well built feeders are formed by employing 26 gauge steel with ⅛ inch rivets.

The inturned top flanges 18 of the end walls 14 and 16 are provided with vertical extensions 79. With the flanges 18, 79 cooperating with the flanges 44, 46 of the upper walls 34, and with the use of the narrow feed opening 90, substantially less feed is lost resulting in a significant economic saving. Likewise, the inturned flange portions as 74 on the section 60 of the lower wall 34 enables loss of feed to be minimized from the lower feed openings 92.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A poultry feeder comprising an elongated trough including side walls and a bottom having a generally inverted V-shaped, longitudinally extending intermediate portion, and an elongated open top and bottom feed hopper mounted longitudinally on the trough in communication therewith for discharging feed by gravity thereinto, said hopper and trough comprising common end walls including inturned marginal flanges, said hopper further comprising side walls extending between said end walls and depending into the trough astraddle said generally V-shaped bottom portion thereof, and a transverse horizontal brace in the trough extending between and secured at its ends to the lower portions of the hopper side walls and traversing the V-shaped trough bottom portion, said side walls and said brace being spaced from and free of the trough bottom, all of the side walls comprising terminal portions abutting the flanges and including inwardly and then right angularly extending return bend flanges engaged behind the first named flanges, said terminal portions further including inwardly right angularly bent enclosing end flanges abutting the end walls and clampingly abutting said end walls with the bight portions of the return bend flanges.

References Cited in the file of this patent
UNITED STATES PATENTS

| | | |
|---|---|---|
| 331,132 | Handley | Nov. 24, 1885 |
| 402,145 | Critchfield et al. | Apr. 30, 1889 |
| 2,827,876 | Trobaugh | Mar. 25, 1958 |
| 2,849,982 | Diseker | Sept. 2, 1958 |
| 2,902,003 | Mund | Sept. 1, 1959 |